United States Patent
Ozawa

(10) Patent No.: US 11,418,715 B2
(45) Date of Patent: Aug. 16, 2022

(54) DISPLAY CONTROL APPARATUS AND CONTROL METHOD THEREFOR

(71) Applicant: CANON KABUSHIKI KAISHA, Tokyo (JP)

(72) Inventor: Hirofumi Ozawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 17/154,888

(22) Filed: Jan. 21, 2021

(65) Prior Publication Data

US 2021/0243380 A1 Aug. 5, 2021

(30) Foreign Application Priority Data

Jan. 30, 2020 (JP) .............................. JP2020-014081

(51) Int. Cl.
*H04N 5/232* (2006.01)
*G06F 3/01* (2006.01)

(52) U.S. Cl.
CPC ....... *H04N 5/232939* (2018.08); *G06F 3/013* (2013.01); *H04N 5/232935* (2018.08)

(58) Field of Classification Search
CPC ....... H04N 5/232939; H04N 5/232935; H04N 5/23219; H04N 5/23293; H04N 5/232941; H04N 5/2251; H04N 5/22525; H04N 5/2254; H04N 5/23218; H04N 5/23245; G06F 3/013; G06F 1/1686; G06F 1/3215; G06F 3/0488; G06F 1/3231; G06F 1/3265
See application file for complete search history.

(56) References Cited

U.S. PATENT DOCUMENTS

| | | | | |
|---|---|---|---|---|
| 8,477,229 | B2* | 7/2013 | Nakai | H04N 5/2354 396/383 |
| 10,447,927 | B2* | 10/2019 | Hoshina | H04N 5/232411 |
| 2010/0066888 | A1* | 3/2010 | Nakai | G03B 7/26 348/E5.022 |
| 2011/0050974 | A1* | 3/2011 | Nakai | H04N 5/23293 348/E5.025 |

(Continued)

FOREIGN PATENT DOCUMENTS

| JP | 2014204169 A | 10/2014 |
|---|---|---|
| JP | 2015119259 A | 6/2015 |

(Continued)

*Primary Examiner* — Timothy J Henn
(74) *Attorney, Agent, or Firm* — Canon U.S.A., Inc. I.P. Division

(57) ABSTRACT

A display control apparatus includes a first display internal to a viewfinder, a second display external to the viewfinder, an eye proximity detector, and an operation unit to switch a display on which a display target is displayed. The eye proximity detector detects, as a state, whether an eye is in proximity of the viewfinder. Where an obtained eye proximity detection state satisfies a first condition, a notification is displayed on a pre-switching display indicating that the display displaying the display target is to be switched. In response to a second condition being satisfied, the display of the display target is switched from the pre-switching display to a post-switching display. In a case where the obtained eye proximity detection state does not satisfy the first condition, the display target is switched to the post-switching display without displaying the notification on the pre-switching display.

17 Claims, 7 Drawing Sheets

(56) References Cited

U.S. PATENT DOCUMENTS

2016/0073030 A1* 3/2016 Park ................ H04N 5/232127
   348/207.11
2020/0021748 A1* 1/2020 Funatsu ............. H04N 5/23296
2020/0221035 A1 7/2020 Miyajima

FOREIGN PATENT DOCUMENTS

JP 2016127498 A 7/2016
WO 2019073790 A1 4/2019

* cited by examiner

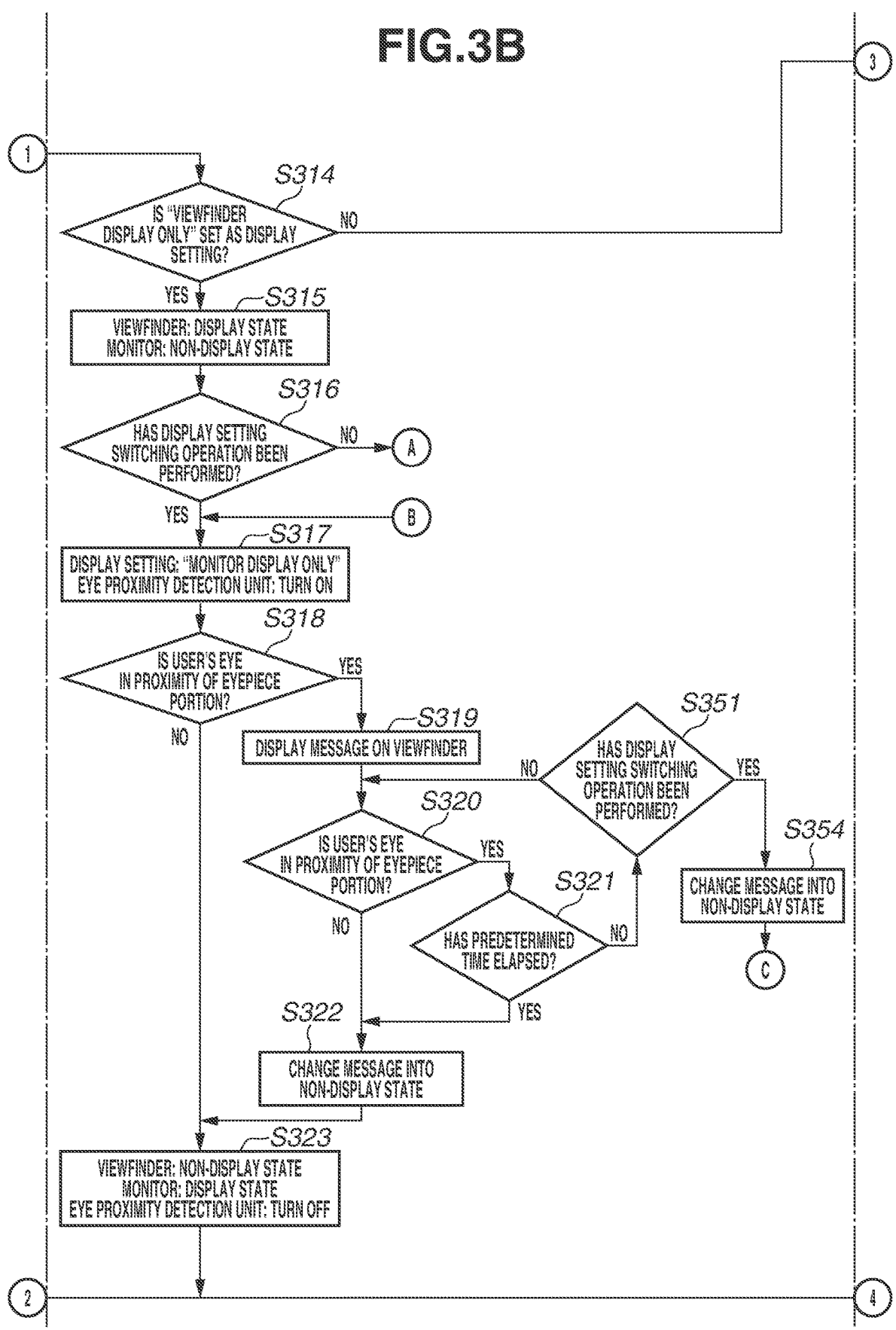

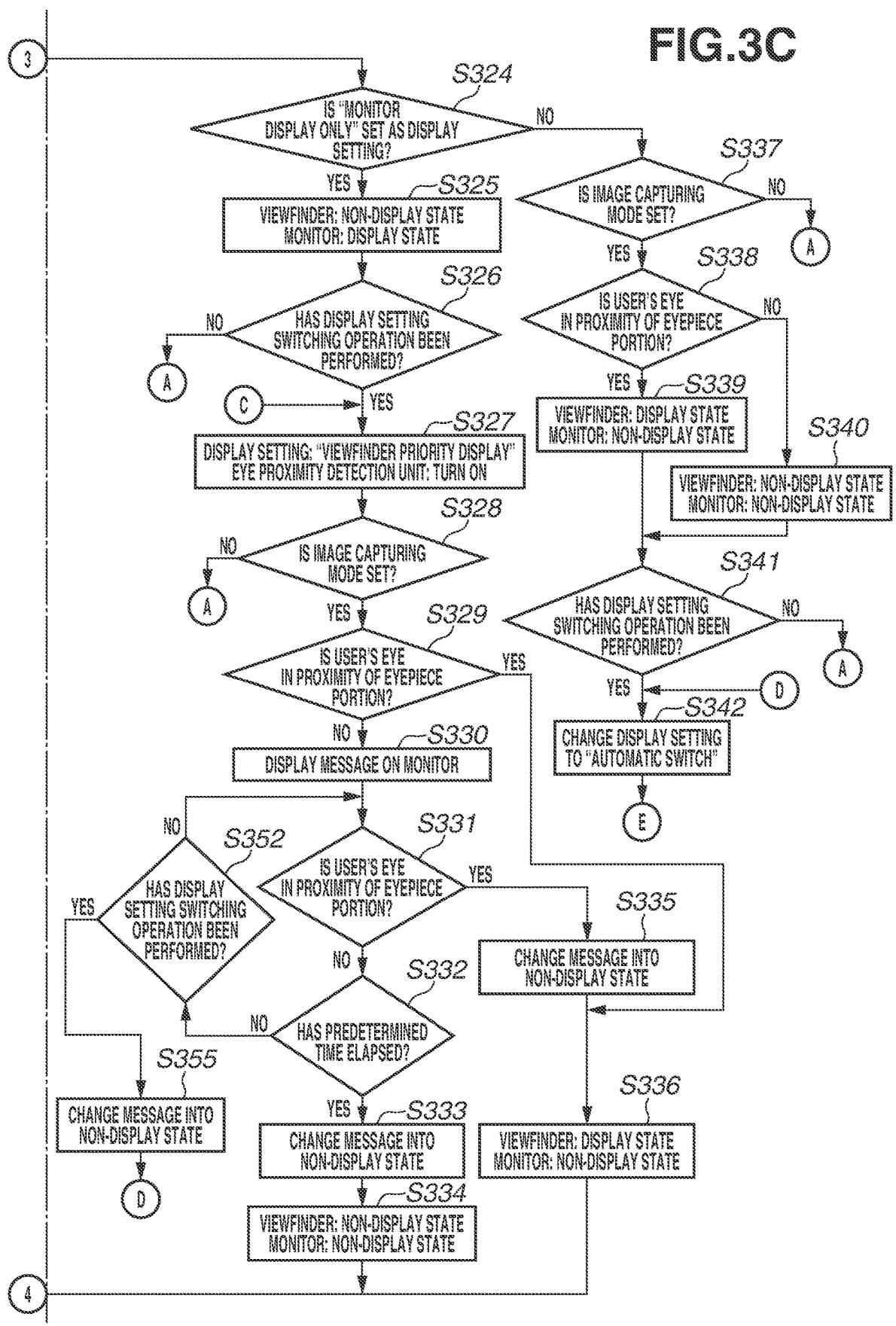

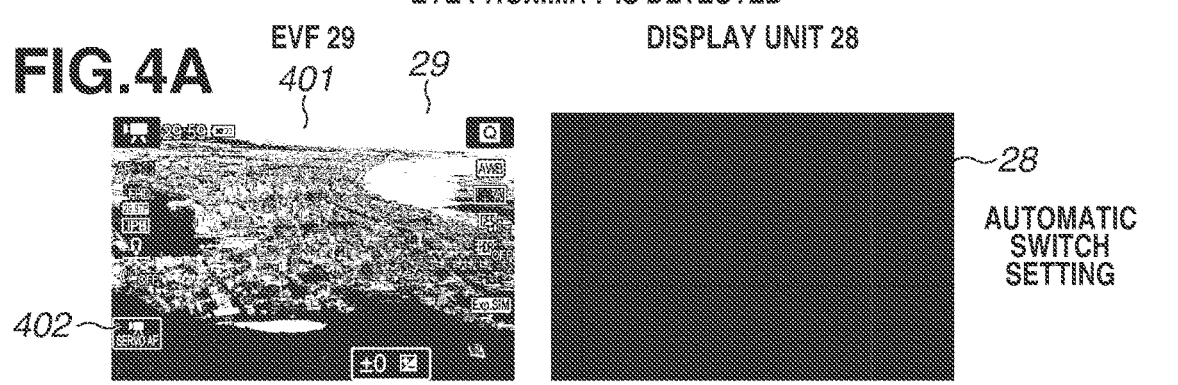
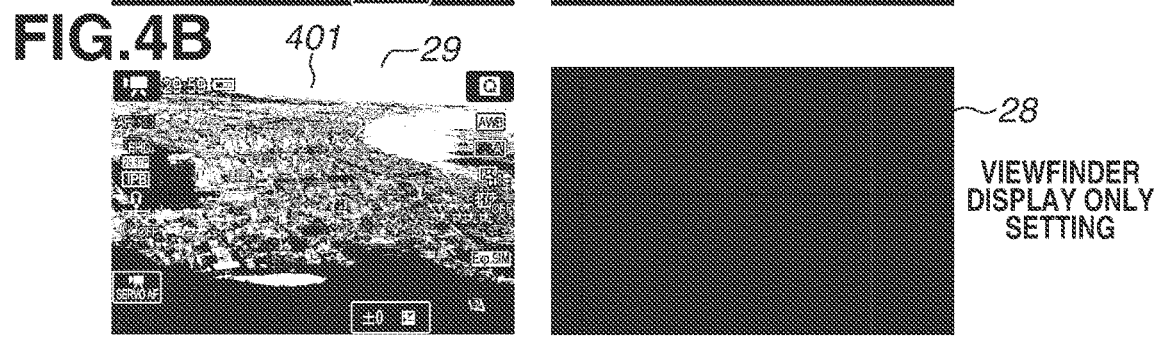
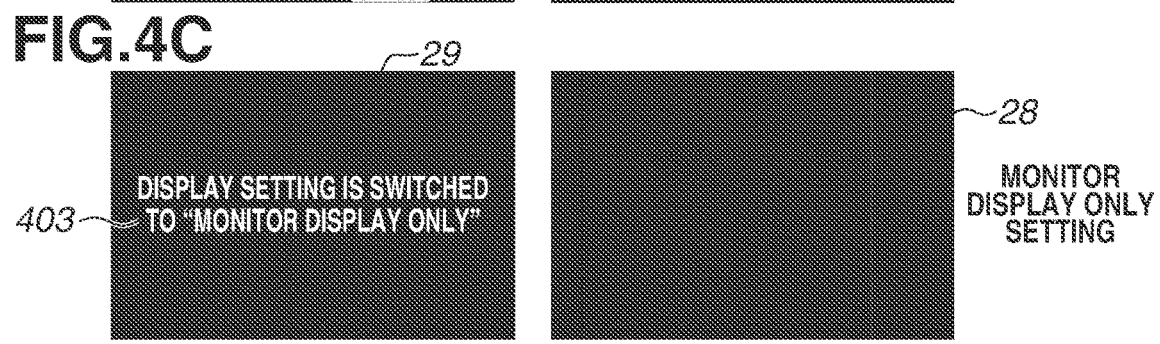
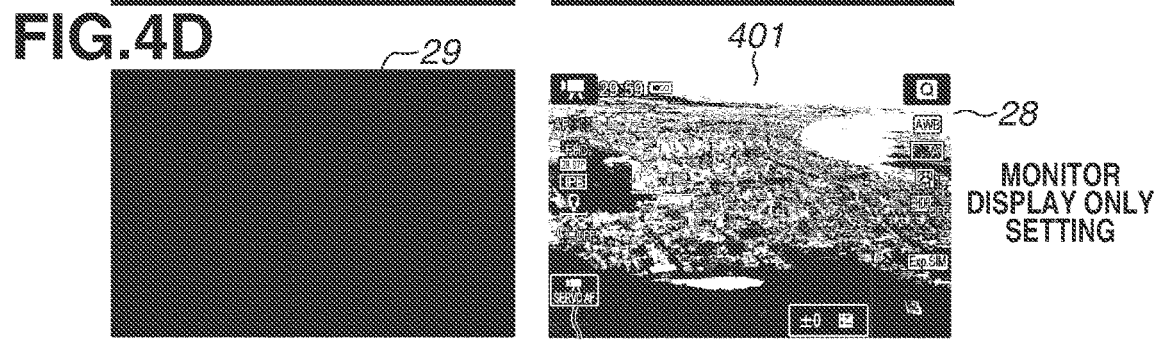
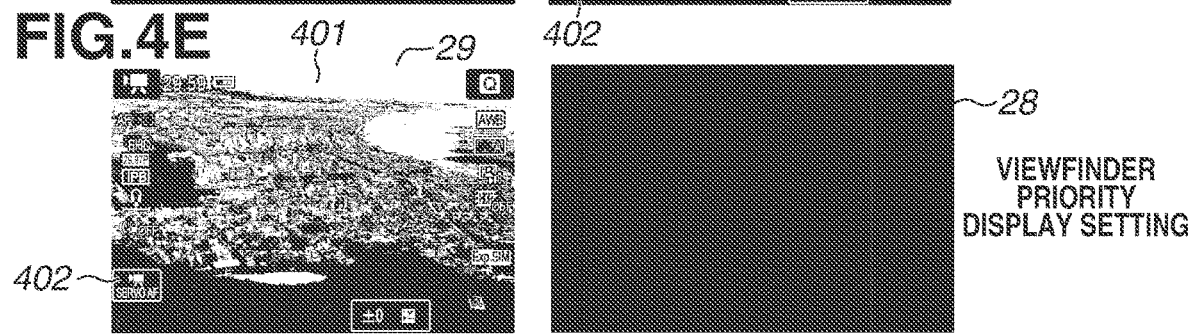

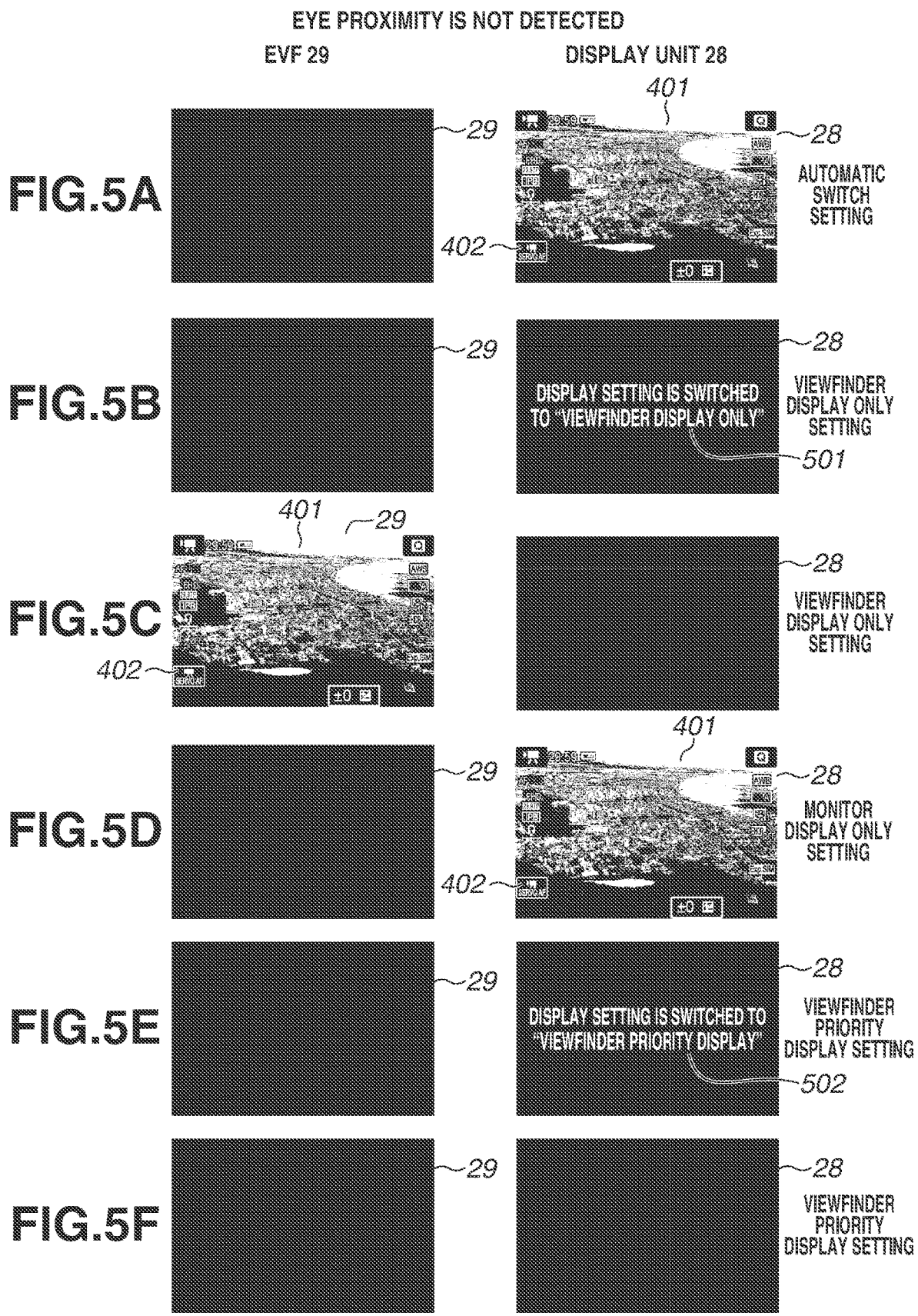

DISPLAY CONTROL APPARATUS AND CONTROL METHOD THEREFOR

BACKGROUND

Field

The present disclosure relates to a display control apparatus that switches display settings for displaying any one of a plurality of display destinations, and a control method for the display control apparatus.

Description of the Related Art

There have been image capturing apparatuses enabling a user to check a captured live view image and a setting menu screen on an electronic viewfinder (EVF) or an external display different from the EVF. Japanese Patent Application Laid-Open No. 2015-119259 discusses a technique in which, in a manual switch mode allowing a user to manually switch a display destination, the display destination is switched to one of an EVF and an external display. Japanese Patent Application Laid-Open No. 2014-204169 discusses a technique in which, in response to a character input instruction issued by a user, a message indicating that a software keyboard is to be displayed on an external display is displayed on an EVF, and then the display of the EVF is changed to a non-display state and the software keyboard is displayed on the external display. After completion of a character input operation using the software keyboard on the external display, the EVF is displayed, and consequently both the EVF and the external display are changed to a display state.

However, according to the technique discussed in Japanese Patent Application Laid-Open No. 2015-119259, in a case where the user switches the display destination from the EVF to the external display while viewing the EVF, the EVF is changed to the non-display state while the user is viewing the EVF. In this case, the user can check whether the display destination is switched only by moving the user's eye away from the EVF and viewing the external display. Meanwhile, in a case where the user switches the display destination from the external display to the EVF while viewing the external display, the external display is changed to the non-display state, and therefore the user needs to view the EVF to check whether the display destination is switched. Processing of displaying a message on the EVF as discussed in Japanese Patent Application Laid-Open No. 2014-204169 is useless in a situation where the user is not viewing the EVF.

SUMMARY

Accordingly, the present disclosure is directed to a technique by which a user can suitably check whether a display setting is switched in response to a situation without causing the user to change a posture when the display setting is switched.

According to an aspect of the present disclosure, a display control apparatus includes a first display unit internal to a viewfinder, a second display unit external to the viewfinder, wherein the first display unit and the second display unit each are a display destination, an eye proximity detection unit configured to detect whether an eye is in proximity of the viewfinder as an eye proximity detection state, and at least one memory and at least one processor which function as: an operation unit configured to switch a display unit on which a display target is displayed, and a control unit, wherein the control unit is configured to control when a display setting is switched between a first setting for displaying the display target on the first display unit internal to the viewfinder and a second setting for displaying the display target on the second display unit external to the viewfinder by an operation on the operation unit, wherein, in a case where the obtained eye proximity detection state satisfies a first condition, the control unit performs control to display, on a pre-switching display unit, a notification indicating that the display unit displaying the display target is to be switched, wherein, in response to a second condition being satisfied, the control unit switches the display of the display target from the pre-switching display unit to a post-switching display unit, and wherein, in a case where the obtained eye proximity detection state does not satisfy the first condition, the control unit performs control to switch the display target to the post-switching display unit without displaying the notification on the pre-switching display unit.

Further features of the present disclosure will become apparent from the following description of exemplary embodiments with reference to the attached drawings. Each of the embodiments of the present disclosure described below can be implemented solely or as a combination of a plurality of the embodiments. In addition, features from different embodiments can be combined where necessary or where the combination of elements or features from individual embodiments in a single embodiment is beneficial.

BRIEF DESCRIPTION OF THE DRAWINGS

FIGS. 3A, 3B, 3C are a flowchart illustrating processing for switching a display setting according to an exemplary embodiment of the present disclosure.

FIGS. 4A, 4B, 4C, 4D, and 4E are diagrams each illustrating a display example of a message for a display setting when eye proximity is detected.

FIGS. 5A, 5B, 5C, 5D, 5E, and 5F are diagrams each illustrating a display example of a message for a display setting when eye proximity is not detected.

DESCRIPTION OF THE EMBODIMENTS

According to the exemplary embodiment of the present disclosure, a user can suitably check, when a display setting is switched, switching of the display setting according to the situations without changing the user's posture.

Exemplary embodiments of the present disclosure will be described in detail below with reference to the accompanying drawings.

While the present disclosure is described in detail based on preferred exemplary embodiments, the present disclosure is not limited to these specific exemplary embodiments. In other words, it is to be noted that the following exemplary embodiment is merely one example for implementing the present disclosure and can be appropriately modified or changed depending on individual constructions and various conditions of apparatuses to which the present disclosure is applied. Various modes which do not depart from the gist of the disclosure are also included in the present disclosure. Further, the exemplary embodiments described are merely examples of the present disclosure, and the exemplary embodiments can be arbitrarily combined. Thus, the present disclosure is in no way limited to the following exemplary embodiment.

Figure 1A:
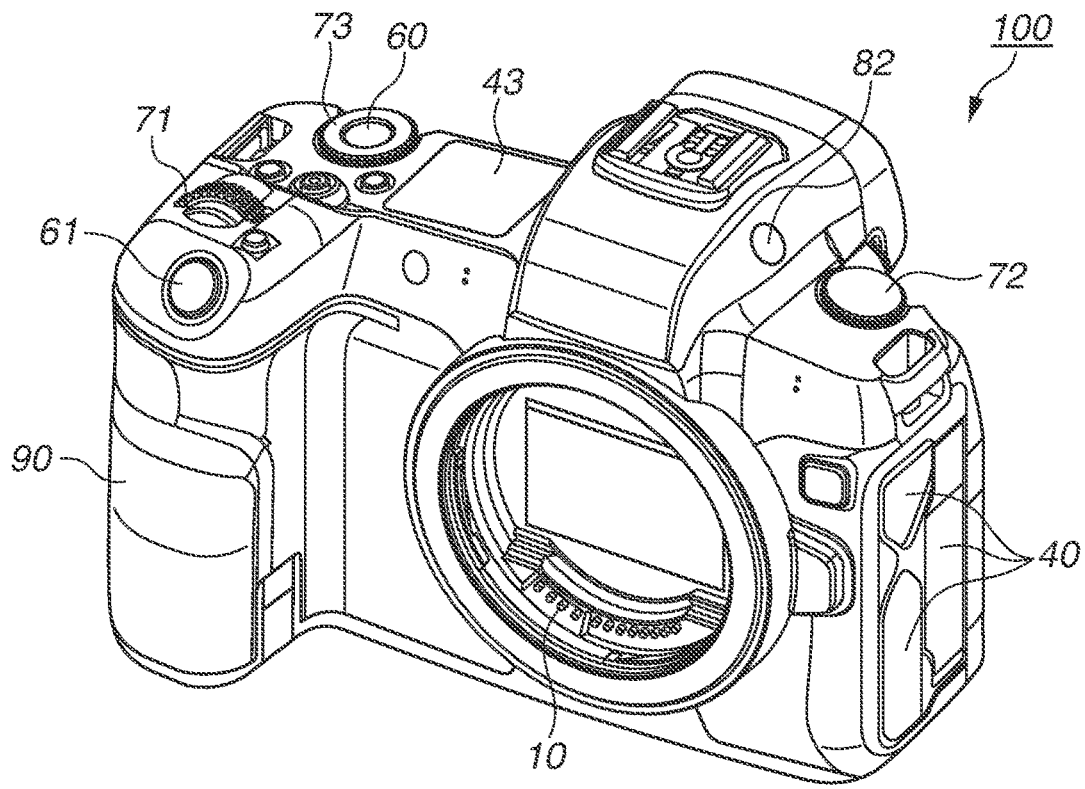
FIGS. 1A and 1B are external views each illustrating a digital camera.
Figure 1B:
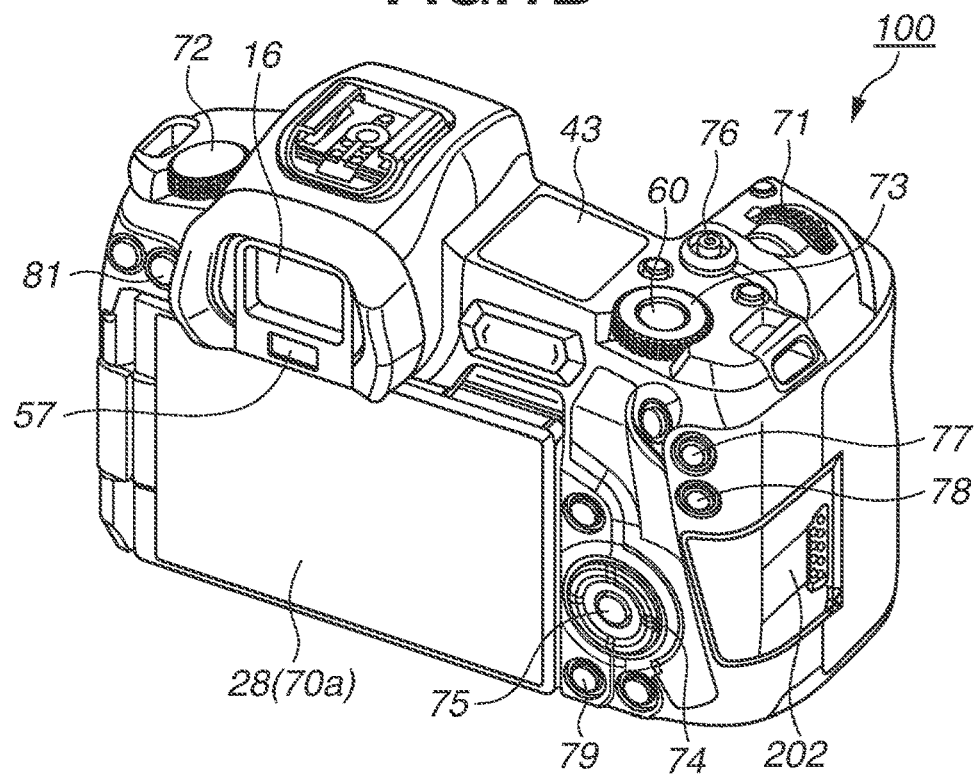

FIGS. 1A and 1B are external views each illustrating a digital camera 100 as an example of an apparatus to which the present disclosure can be applied. FIG. 1A is a perspective view illustrating a front of the digital camera 100. FIG. 1B is a perspective view illustrating a back of the digital camera 100. In FIGS. 1A and 1B, a display unit 28 is disposed on the back surface of the digital camera 100 and displays images and various information. A touch panel 70a can detect a touch operation on a display surface (operation surface) of the display unit 28. A display unit outside viewfinder 43 is a display unit provided on an upper surface of the digital camera 100. Various setting values, including a shutter speed and an aperture value, for the digital camera 100 are displayed on the display unit outside viewfinder 43.

A shutter button 61 is an operation unit for issuing an image capturing instruction. A mode selection switch 60 is an operation unit for switching various modes. Terminal covers 40 are covers each for protecting a connector (not illustrated), such as a connection cable, which connects the digital camera 100 with the connection cable to be connected to an external apparatus. An electronic main dial 71 is a rotational operation member included in an operation unit 70. The electronic main dial 71 is turned by user to change setting values, including the shutter speed and the aperture value. A power supply switch 72 is an operation member that switches ON/OFF of a power supply of the digital camera 100. An electronic sub-dial 73 is a rotational operation member that is included in the operation unit 70 and can be used for movement of a selection frame, image feeding, and the like. A directional pad 74 is a four-way operational key that is included in the operation unit 70 and is configured such that an upper portion, a lower portion, a left portion, and a right portion thereof can be pressed. An operation corresponding to a pressed portion of the directional pad 74 can be performed. A SET button 75 is a pressing button that is included in the operation unit 70 and is used mainly for, for example, determining a selection item. A motion image button 76 is used to issue an instruction to start or stop motion image capturing (recording). An automatic exposure (AE) lock button 77 is included in the operation unit 70. When the AE lock button 77 is pressed in an image capturing standby state, an exposure state can be fixed. A zoom button 78 is included in the operation unit 70. The zoom button 78 is an operation button for turning on or off a zoom mode on a live view display in an image capturing mode. By operating the electronic main dial 71 after the zoom mode is turned on, a live view (LV) image can be enlarged or reduced. In a playback mode, the zoom button 78 functions as a zoom button for enlarging a playback image and increasing an enlargement ratio. A playback button 79 is included in the operation unit 70. The playback button 79 is an operation button for switching an operation mode between the image capturing mode and the playback mode. The operation mode is shifted to the playback mode in a case where the playback button 79 is pressed in the image capturing mode, and a latest image among images recorded on a recording medium 200 can be displayed on the display unit 28. A menu button 81 is included in the operation unit 70. When the menu button 81 is pressed, a menu screen on which various settings can be performed is displayed on the display unit 28. A user can intuitively perform various settings using the menu screen displayed on the display unit 28, the directional pad 74, and the SET button 75.

A display destination switch button 82 is included in the operation unit 70 and functions as a button for switching a control method for a display destination of a LV image and various information. Examples of the display destination control method include a method of automatically switching the display destination to one of the display unit 28 and an electronic viewfinder (EVF) 29 by using an eye proximity detection unit 57, and a method of fixing the display destination to one of the display unit 28 and the EVF 29. Every time the display destination switch button 82 is pressed, the display setting can be switched. The display setting will be described in detail below. In the configuration example illustrated in FIG. 1A, the display destination switch button 82 is disposed in an eyepiece portion 16 at a position on the opposite side where the shutter button 61 is disposed. This is because the display destination can be switched by the user's left hand in a state where the user grips a grip portion 90 by the right hand and can operate the shutter button 61 with the forefinger of the right hand. Accordingly, the location where the display destination switch button 82 is disposed is not limited to this example. For example, the display destination switch button 82 may be disposed at a position where the user can press the display destination switch button 82 with the thumb of the right hand in a state where the user grips the grip portion 90 by the right hand and can operate the shutter button 61 with the forefinger of the right hand. The above-described position of the display destination switch button 82 allows the user to switch the display setting in a state where the frame body of the digital camera 100 can be firmly gripped with both hands and the shutter button 61 can be promptly operated after the display destination is switched. This leads to a reduction in loss of image capturing opportunities. In the present exemplary embodiment, a dedicated button for switching the display setting is mounted on the digital camera 100. However, if a display destination switch function can be allocated to an operation member having another function, there is no need to mount the dedicated button on the digital camera 100.

A communication terminal 10 is used for the digital camera 100 to communicate with a (detachable) lens. The eyepiece portion 16 is an eyepiece viewfinder (a look-through type viewfinder) and enables the user to visually observe a video image displayed on the EVF 29 provided in the digital camera 100 through the eyepiece portion 16. The eye proximity detection unit 57 is an eye proximity detection sensor that detects whether a user's eye is in the proximity of the eyepiece portion 16. A lid 202 is a lid of a slot in which the recording medium 200 is stored. The grip portion 90 is a holding portion having a shape that enables the user to easily grip the holding portion with the right hand when the user holds the digital camera 100. The shutter button 61 and the electronic main dial 71 are disposed at positions where the shutter button 61 and the electronic main dial 71 can be operated with the forefinger of the right hand while the user holds the digital camera 100 by gripping the grip portion 90 with the little finger, fourth finger, and middle finger of the right hand. The electronic sub-dial 73 is disposed at a position where the electronic sub-dial 73 can be operated with the thumb of the right hand in the above-described state.

Figure 2:
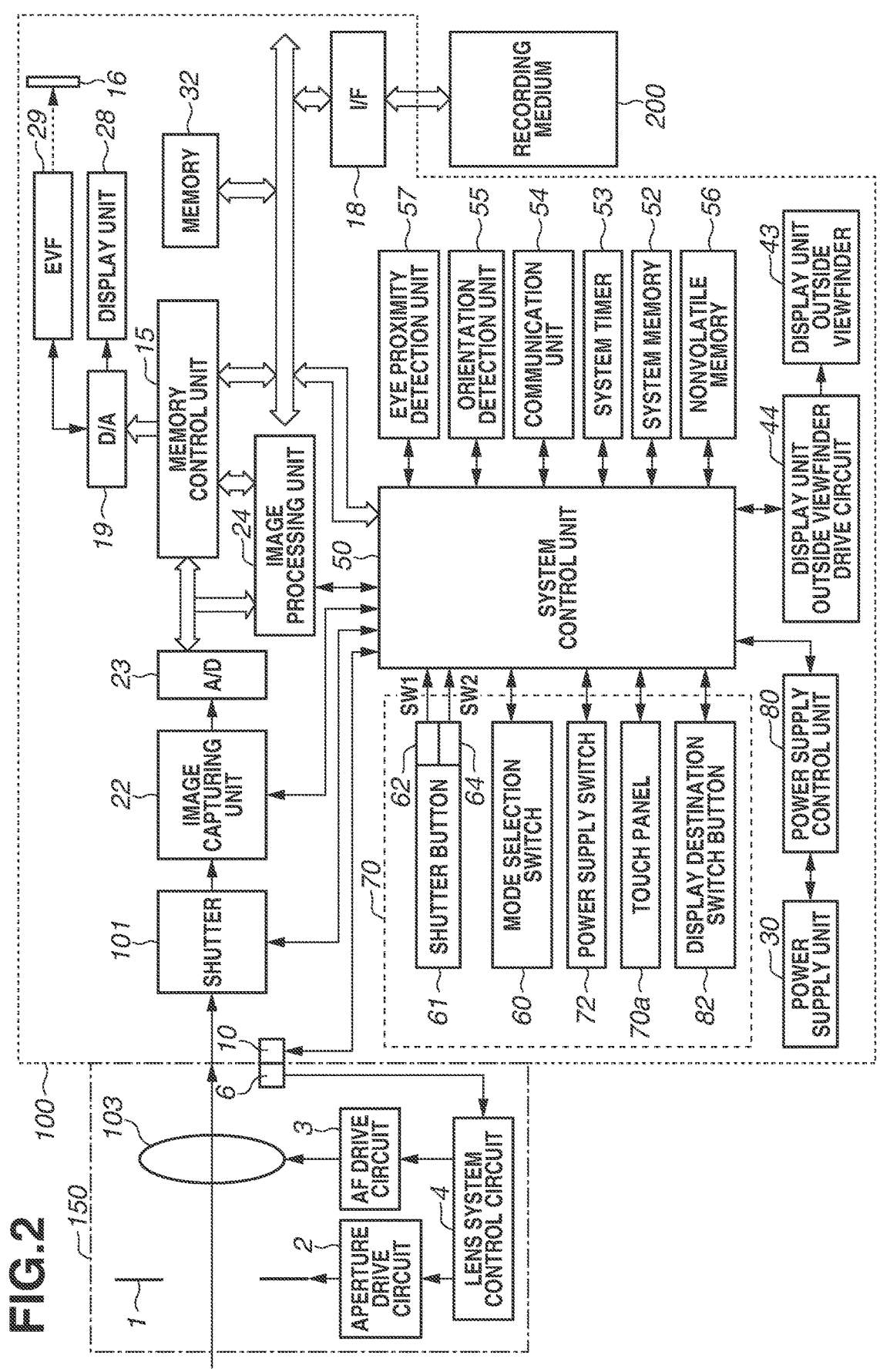
FIG. 2 is a block diagram schematically illustrating a hardware configuration example of the digital camera.

FIG. 2 is a block diagram illustrating a configuration example of the digital camera 100 according to the present exemplary embodiment. In the configuration example illustrated in FIG. 2, a lens unit 150 is a lens unit on which an exchangeable image capturing lens is mounted. A lens 103 is generally composed of a plurality of lenses. In this case, however, only one lens is illustrated for ease of illustration. A communication terminal 6 is used for the lens unit 150 to communicate with the digital camera 100. The communication terminal 10 is used for the digital camera 100 to communicate with the lens unit 150. The lens unit 150 communicates with a system control unit 50 via the communication terminals 6 and 10, causes a lens system control circuit 4 provided in the lens unit 150 to control an aperture 1 via an aperture drive circuit 2, and changes the position of the lens 103 via an autofocus (AF) drive circuit 3, to perform focusing.

A shutter 101 is a focal plane shutter capable of controlling an image capturing unit 22 at any exposure time under control of the system control unit 50.

The image capturing unit 22 is an image sensor including a charge-coupled device (CCD) sensor, a complementary metal-oxide semiconductor (CMOS) sensor, or the like, which converts an optical image into an electrical signal. The image capturing unit 22 may include an imaging plane phase difference sensor that outputs defocus amount information to the system control unit 50. An analog-to-digital (A/D) converter 23 converts an analog signal into a digital signal. The A/D converter 23 is used to convert an analog signal output from the image capturing unit 22 into a digital signal.

An image processing unit 24 performs predetermined pixel interpolation processing, resize processing, such as reduction, or color conversion processing on data received from the A/D converter 23, or on data received from a memory control unit 15. Further, the image processing unit 24 performs predetermined calculation processing using captured image data. The system control unit 50 performs exposure control and ranging control based on the calculation result obtained by the image processing unit 24. By the above-described configuration, through-the-lens (TTL) AF processing, AE processing, and flash preliminary emission (EF) processing are carried out. The image processing unit 24 also performs predetermined calculation processing using captured image data, and performs TTL auto white balance (AWB) processing based on the obtained calculation result.

Output data from the A/D converter 23 is directly written into a memory 32 via the image processing unit 24 and the memory control unit 15, or via the memory control unit 15. The memory 32 stores image data that is obtained by the image capturing unit 22 and is converted into digital data by the A/D converter 23, and also stores image data to be displayed on the display unit 28 or the EVF 29. The memory 32 has a storage capacity sufficient to store a predetermined number of still images and motion image and audio data corresponding to a predetermined period of time period.

The memory 32 also functions as an image display memory (video memory). A digital-to-analog (D/A) converter 19 converts image display data stored in the memory 32 into an analog signal and supplies the analog signal to the display unit 28 or the EVF 29. Thus, the display image data written in the memory 32 is displayed on the display unit 28 or the EVF 29 via the D/A converter 19. The display unit 28 and the EVF 29 display information corresponding to the analog signal received from the D/A converter 19 on a display, such as a liquid crystal display (LCD) or an organic electroluminescence (EL) display. The digital signal, which is obtained by performing A/D conversion once by the A/D converter 23 and is stored in the memory 32, is converted into an analog signal by the D/A converter 19, and the analog signal is sequentially transferred and displayed on the display unit 28 or the EVF 29, whereby LV display can be performed. An image to be displayed in live view is hereinafter referred to as a LV image.

The display unit outside viewfinder 43 displays various setting values, including the shutter speed and the aperture value, for the digital camera 100 via an display unit outside viewfinder drive circuit 44.

A nonvolatile memory 56 is an electrically erasable/recordable memory. For example, an electrically erasable programmable read-only memory (EEPROM) is used as the nonvolatile memory 56. The nonvolatile memory 56 stores constants, programs, and the like to be used for operation of the system control unit 50. The programs described herein refer to programs for executing various flowcharts to be described below in the present exemplary embodiment.

The system control unit 50 is a control unit including at least one processor or circuit, and controls the overall operation of the digital camera 100. Each processing according to the present exemplary embodiment to be described below is implemented by executing the above-described programs recorded on the nonvolatile memory 56. For example, a random access memory (RAM) is used as a system memory 52. Constants and variables to be used for operation of the system control unit 50, programs read out from the nonvolatile memory 56, and the like are loaded into the system memory 52. The system control unit 50 also performs display control by controlling the memory 32, the D/A converter 19, the display unit 28, and the like.

A system timer 53 is a clock unit that measures time for various control operations, and measures time of a built-in clock.

The operation unit 70 is an operation unit for inputting various operation instructions to the system control unit 50. The mode selection switch 60 is an operation member included in the operation unit 70 and switches an operation mode of the system control unit 50 to one of a still image capturing mode, a motion image capturing mode, a playback mode, and the like. Examples of the still image capturing mode include an auto image capturing mode, an auto scene discrimination mode, a manual mode, an aperture priority mode (Av mode), a shutter speed priority mode (Tv mode), and a program AE mode (P mode). Examples of the still image capturing mode also include a various scenes mode for making an image capturing setting for each image capturing scene, and a custom mode. The user can directly switch the operation mode to any one of the above-described modes by the mode selection switch 60. Alternatively, after the screen is switched to a list screen for the image capturing mode once by the mode selection switch 60, any one of the plurality of displayed modes may be selected and the operation mode may be switched by another operation member. Similarly, the motion image capturing mode may include a plurality of modes.

A first shutter switch 62 is turned on when the shutter button 61 provided on the digital camera 100 is being operated, or when the shutter button 61 is half-pressed (image capturing preparation instruction), and generates a first shutter switch signal SW1. In response to the first shutter switch signal SW1, an image capturing preparation operation such as AF processing, AE processing, AWB processing, or EF processing is started.

A second shutter switch 64 is turned on when the operation of the shutter button 61 is completed, or when the shutter button 61 is fully-pressed (image capturing instruction), and generates a second shutter switch signal SW2. In response to the second shutter switch signal SW2, a series of image capturing processing from processing of reading out a signal from the image capturing unit 22 to processing of writing a captured image into the recording medium 200 as an image file is started.

The operation unit 70 includes various operation members as an input unit that receives an operation from the user. The operation unit 70 includes at least the following operation units. That is, the operation unit 70 includes at least the shutter button 61, the electronic main dial 71, the power supply switch 72, the electronic sub-dial 73, and the directional pad 74. The operation unit 70 also includes the SET button 75, the motion image button 76, the AE lock button 77, the zoom button 78, the playback button 79, the menu button 81, and the display destination switch button 82.

A power supply control unit 80 includes a battery detection circuit, a direct current (DC)-DC converter, a switch circuit for switching a block to be energized, or the like, and detects whether a battery is mounted, the type of the battery, and a remaining battery capacity. Further, the power supply control unit 80 controls the DC-DC converter based on the detection result and an instruction from the system control unit 50, and supplies a required voltage to the units including the recording medium 200 for a required period of time period. A power supply unit 30 includes a primary battery, such as an alkaline battery or a lithium (Li) battery, a secondary battery, such as a NiCd battery, a NiMH battery, or a Li battery, an alternate current (AC) adaptor, or the like.

A recording medium interface (I/F) 18 is an interface with the recording medium 200, such as a memory card or a hard disk. The recording medium 200 is a recording medium, such as a memory card for recording captured images, and is composed of a semiconductor memory, a magnetic disk, or the like.

A communication unit 54 is connected wirelessly or with a cable, and transmits or receives video signals and audio signals. The communication unit 54 is also connectable to a wireless local area network (LAN) and the Internet. Further, the communication unit 54 can communicate with an external apparatus via Bluetooth® or Bluetooth® Low Energy. The communication unit 54 can transmit images (including a LV image) captured by the image capturing unit 22 and images recorded on the recording medium 200, and can receive images and other various information from an external apparatus.

An orientation detection unit 55 detects an orientation of the digital camera 100 in a gravity direction. Based on the orientation detected by the orientation detection unit 55, it can be determined whether an image captured by the image capturing unit 22 is an image captured when the digital camera 100 is held in a landscape orientation, or an image captured when the digital camera 100 is held in a portrait orientation. The system control unit 50 can add orientation information corresponding to the orientation detected by the orientation detection unit 55 to an image file of images captured by the image capturing unit 22, and can record rotated images. An acceleration sensor, a gyroscope sensor, or the like can be used as the orientation detection unit 55. A motion (e.g., pan, tilt, lift-up, or stationary state) of the digital camera 100 can also be detected by using the acceleration sensor or gyroscope sensor serving as the orientation detection unit 55.

The eye proximity detection unit 57 is an eye proximity detection sensor that detects that an eye (object) has approached (eye proximity) or has moved away from (eye non-proximity) the eyepiece portion 16 of the viewfinder (proximity detection). For example, an infrared proximity sensor can be used as the eye proximity detection unit 57. The eye proximity detection unit 57 can detect that any object has approached the eyepiece portion 16 of the viewfinder incorporating the EVF 29. When an object has approached the eyepiece portion 16, an infrared ray projected from a projection portion (not illustrated) of the eye proximity detection unit 57 is reflected and received by a light-receiving portion (not illustrated) of the infrared proximity sensor. A distance (eye proximity distance) by which the object has approached from the eyepiece portion 16 can be determined based on the amount of the received infrared ray. Thus, the eye proximity detection unit 57 performs eye proximity detection processing for detecting the proximity distance from the object to the eyepiece portion 16. When, in an eye non-proximity state (non-proximity state), in a case where an object approaching the eyepiece portion 16 by a distance within a predetermined distance is detected, it is determined that the use's eye is in the proximity of the eyepiece portion 16. When, in the eye proximity state (proximity state), in a case where the object detected to be in the proximity of the eyepiece portion 16 is moved away by more than the predetermined distance, it is determined that the user's eye has moved away from the eyepiece portion 16. A threshold for detecting the eye proximity state and a threshold for detecting the eye non-proximity state may be set to different values by, for example, providing a hysteresis. After the eye proximity is detected, the eye proximity state is maintained until the eye non-proximity is detected. After the eye non-proximity is detected, the eye non-proximity state is maintained until the eye proximity is detected. The infrared proximity sensor is merely an example. As the eye proximity detection unit 57, any other sensors can be adopted as long as the sensors can detect the eye proximity, or can detect that there is an eye or an object approaching the eyepiece portion 16.

The system control unit 50 switches display (display state) and non-display (non-display state) of the display unit 28 and the EVF 29 based on a state detected by the eye proximity detection unit 57. Specifically, in a case where "Automatic Switch" is set as a method for switching the display destination at least in the image capturing standby state, the display destination is set to the display unit 28 and the display thereof is turned on and the EVF 29 is in the non-display state in the eye non-proximity state. In the eye-proximity state, the display destination is set to the EVF 29, the display thereof is turned on, and the display unit 28 is in the non-display state. Examples of the display setting include the following settings. As described above, every time the display destination switch button 82 is pressed, the following settings are sequentially switched (toggled). In the present exemplary embodiment, every time the display destination switch button 82 is pressed, the display setting is switched in the following order, that is, an automatic switch setting, a viewfinder display only setting, a monitor display only setting, a viewfinder priority display setting. The order of switching the display setting is not limited to the order described above. The above-described viewfinder corresponds to the EVF 29, and the monitor corresponds to the display unit 28.

Automatic Switch Setting (Hereinafter Referred to as Automatic Switch)

Automatic Switch is a setting for switching the display (display state) and the non-display (non-display state) of the display unit 28 and the EVF 29 based on the state detected by the eye proximity detection unit 57. In the eye non-proximity state, the display destination is set to the display unit 28 and the display of the display unit 28 is turned on, and the EVF 29 is in the non-display state. In the eye-proximity state, the display destination is set to the EVF 29 and the display of the EVF 29 is turned on, and the display unit 28 is in the non-display state. In this case, the eye proximity detection sensor is turned on.

Viewfinder Display Only Setting (Hereinafter Referred to as Viewfinder Display Only)

Viewfinder Display Only is a setting for fixing the display destination to the EVF 29, regardless of the state detected by the eye proximity detection unit 57. The display of the EVF 29 is turned on and the display unit 28 is in the non-display state. After the display unit 28 is changed into the non-display state, the eye proximity detection sensor is turned off.

Monitor Display Only Setting (Hereinafter Referred to as Monitor Display Only)

Monitor Display Only is a setting for fixing the display destination to the display unit 28, regardless of the state detected by the eye proximity detection unit 57. The display of the display unit 28 is turned on and the EVF 29 is in the non-display state. After the EVF 29 is changed into the non-display state, the eye proximity detection sensor is turned off.

Viewfinder Priority Display Setting (Hereinafter Referred to as Viewfinder Priority Display)

Viewfinder Priority Display is a setting in which the EVF 29 is in the display state only in the eye-proximity state in the image capturing standby state (image capturing mode), and the display state and the non-display state of the EVF 29 are switched in response to the state detected by the eye proximity detection unit 57 in a state other than the image capturing standby state (such as the playback mode or setting menu screen). Specifically, in the image capturing standby state, in a case where the eye-proximity is detected by the eye proximity detection unit 57, the display of the EVF 29 is turned on and the display of the display unit 28 is turned off (non-display state), and in a case where the eye-proximity is not detected, the display of the EVF 29 and the display of the display unit 28 are turned off (non-display state). In a state other than the image capturing standby state, a control operation similar to the automatic switch setting is performed. In an image capturing apparatus incorporating the EVF 29, the viewfinder priority setting makes it possible to use the image capturing apparatus as the one incorporating an optical viewfinder. After the display setting is switched to Viewfinder Priority Display, the eye proximity detection sensor is turned on.

The touch panel 70*a* and the display unit 28 can be integrally formed. For example, the touch panel 70*a* is configured to have a light transmittance that does not interfere with the display of the display unit 28, and is attached to a top layer of a display surface of the display unit 28. Input coordinates of the touch panel 70*a* are associated with display coordinates of the display unit 28 on a display screen. This makes it possible to provide a graphical user interface (GUI) with which the user seems to be capable of directly operating the screen displayed on the display unit 28. The system control unit 50 can detect the following operations or states on the touch panel 70*a*.

A state where a finger or pen that is not in contact with the touch panel 70*a* newly touches the touch panel 70*a*. That is, start of touching (hereinafter referred to as touch-down).

A state where the touch panel 70*a* is touched with a finger or pen (hereinafter referred to as touch-on).

A state where a finger or pen moves on the touch panel 70*a* in a state where the finger or pen is in contact with the touch panel 70*a* (hereinafter referred to as touch-move).

A state where the finger or pen that is in contact with the touch panel 70*a* is moved away from the touch panel 70*a*. That is, end of touching (hereinafter referred to as touch-up).

A state where nothing touches the touch panel 70*a* (hereinafter referred to as touch-off).

When a touch-down is detected, a touch-on is detected at the same time. After the touch-down, the touch-on is continuously detected in a normal state until a touch-up is detected. A state where a touch-move is detected corresponds to a state where a touch-on is detected. Even when a touch-on is detected, a touch-move is not detected as long as the touch position is not moved. A touch-off occurs after a touch-up has been detected for all fingers or pens that had been touching.

Information about the above-described operations or states and coordinates of positions where the finger or pen is in contact with the touch panel 70*a* is sent to the system control unit 50 via an internal bus. The system control unit 50 determines which operation (touch operation) has been performed on the touch panel 70*a* based on the information. As for the touch-move, the direction in which a finger or pen moves on the touch panel 70*a* can also be determined for each vertical component or horizontal component on the touch panel 70*a* based on a change in position coordinates. In a case where a touch-move by a predetermined distance or more is detected, it is determined that a slide operation has been performed. An operation in which a finger is quickly moved a certain distance while the finger is in contact with the touch panel 70*a* and then the finger is released from the touch panel 70*a* is referred to as "flick". In other words, a flick is an operation of quickly flicking a finger on the touch panel 70*a*. A flick can be determined to have been performed in a case where a touch-move of more than or equal to a predetermined distance and at more than or equal to a predetermined speed is detected and a touch-up is then detected (it can be determined that a flick has been performed after a slide operation). When a plurality of locations (two points, for example) are touched at the same time and the touched positions are brought together, the touch operation is called a "pinch-in", and when the touched positions are moved apart, the touch operation is called a "pinch-out". Pinch-out and pinch-in are collectively referred to as a pinch operation (or referred to as "pinching"). Any of a variety of types of touch panels, such as a resistive film type, a capacitance type, a surface acoustic wave type, an infrared type, an electromagnetic induction type, an image recognition type, and a photosensor type, may be used as the touch panel 70*a*. Depending on the type, a touch is detected when contact is made with the touch panel 70*a*, or a touch is detected when a finger or pen has approached the touch panel 70*a*, and either of these types may be used.

Figure 3A:
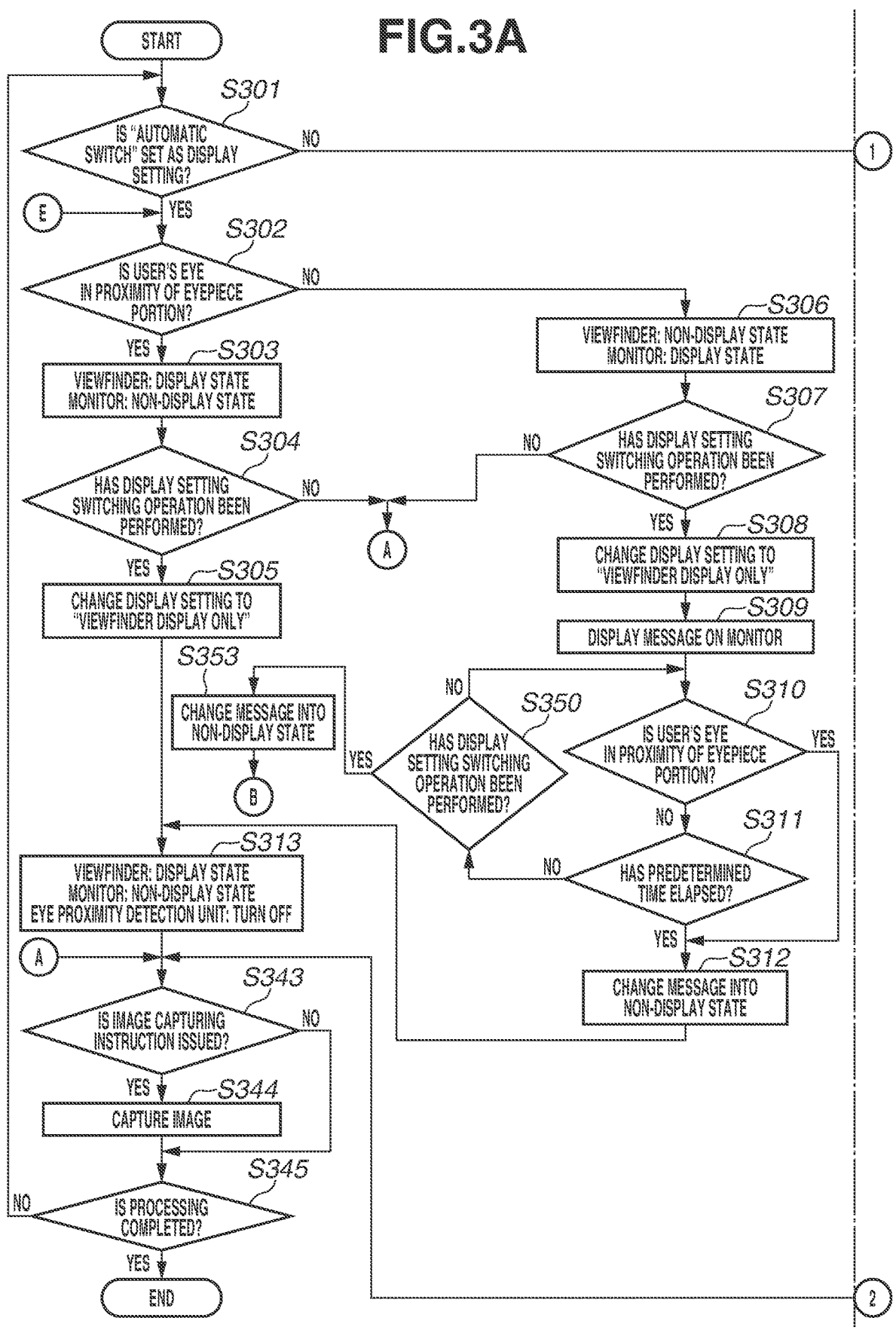

FIGS. 3A, 3B, and 3C are a flowchart illustrating control processing for display of the EVF 29 and the display unit 28 in a case where the display setting is switched according to the present exemplary embodiment. This control processing is implemented such that programs recorded on the nonvolatile memory 56 are loaded into the system memory 52 and the loaded programs are executed by the system control unit 50 in the digital camera 100. The flowchart illustrated in FIGS. 3A to 3C is started when the digital camera 100 is activated (powered on).

In step S301, the system control unit 50 determines whether Automatic Switch is set as the display setting with reference to the nonvolatile memory 56. In a case where it is determined that Automatic Switch is set as the display setting (YES in step S301), the processing proceeds to step S302. In a case where Automatic Switch is not set as the display setting (NO in step S301), the processing proceeds to step S314.

In step S302, the system control unit 50 determines whether the user's eye is in the proximity of the eyepiece portion 16 by using the eye proximity detection unit 57. In a case where the user's eye is in the proximity of the eyepiece portion 16 (YES in step S302), the processing proceeds to step S303. In a case where the user's eye is not in the proximity of the eyepiece portion 16 (NO in step S302), the processing proceeds to step S306.

In step S303, the system control unit 50 switches the viewfinder (EVF 29) to the display state and switches the monitor (display unit 28) to the non-display state. In other words, nothing is displayed on the display unit 28. The term "display state" used herein refers to a state where, in the image capturing standby state (image capturing mode), a live view image captured by the image capturing unit 22 (hereinafter referred to as a LV image) and information about image capturing, such as the shutter speed and an International Standards Organization (ISO) sensitivity, which is displayed together with the LV image, are displayed. In a state other than the image capturing standby state (i.e., processing other than processing in the image capturing mode), the display state indicates a state where the setting menu screen or the playback screen is displayed. Meanwhile, the term "non-display state" refers to a state where nothing, that is, a LV image nor information about image capturing, is displayed (non-display state). FIG. 4A illustrates a display example of the EVF 29 and the display unit 28 in the above-described case. Each display example will be described below. Information to be displayed in the display state is not limited to the example described above.

In step S304, the system control unit 50 determines whether the operation of switching the display setting has been performed. In a case where the switching operation has been performed (YES in step S304), the processing proceeds to step S305. In a case where the switching operation has not been performed (NO in step S304), the processing proceeds to step S343. The term "switching operation" used herein refers to an operation in which the display destination switch button 82 is pressed. The switching operation is not limited to the operation of pressing the display destination switch button 82, but instead may be a touch operation on an item which has a display destination switch function and is displayed on the touch panel 70a.

In step S305, the system control unit 50 changes the display setting to Viewfinder Display Only and stores the changed display setting in the nonvolatile memory 56.

In step S306, the system control unit 50 switches the EVF 29 to the non-display state and switches the display unit 28 to the display state. In a case where the determination result in step S302 indicates "NO", it is obvious that the user's eye is not in the proximity of the eyepiece portion 16. In other words, it is assumed that the user is not viewing the EVF 29, but is viewing the display unit 28. Accordingly, only the display unit 28 is displayed. FIG. 5A illustrates a display example of the EVF 29 and the display unit 28 in this case.

In step S307, like in step S304, the system control unit 50 determines whether the operation of switching the display setting has been performed. In a case where the switching operation has been performed (YES in step S307), the processing proceeds to step S308. In a case where the switching operation has not been performed (NO in step S307), the processing proceeds to step S343.

In step S308, like in step S305, the system control unit 50 changes the display setting to Viewfinder Display Only and stores the changed display setting in the nonvolatile memory 56.

In step S309, the system control unit 50 displays a message (notification) indicating that the display destination is switched to the display unit 28. FIG. 5B illustrates a display example of the EVF 29 and the display unit 28 in this case. After the message is displayed, timer counting is started. In a case where the determination result in step S302 indicates "NO", it is assumed that the user is not viewing the EVF 29, but is viewing the display unit 28. Accordingly, in response to the display setting switched from Automatic Switch to Viewfinder Display Only by the display setting switching operation in step S307, the LV image that has been displayed on the display unit 28 suddenly disappears, and then nothing is displayed on the display unit 28. Although the user is the one who has switched the display setting by performing an operation, if the display unit 28 is suddenly switched to the non-display state, the user may be confused. Accordingly, it may be desirable to switch the display unit 28 to the non-display state after displaying a message, instead of suddenly switch the display unit 28 to the non-display state. With this configuration, the user can visually observe that the display destination is switched from the display unit 28 to the EVF 29 while continuously viewing the display unit 28, without changing the user's posture with respect to the digital camera 100. The message display can prompt the user to view the EVF 29 without confusing the user. Alternatively, in a case where the user does not wish to change the user's posture with respect to the digital camera 100 to view the EVF 29, the user can perform an additional switching operation to switch the display setting to another display setting.

In step S310, like in step S302, the system control unit 50 determines whether the user's eye is in the proximity of the eyepiece portion 16. In a case where the user's eye is in the proximity of the eyepiece portion 16 (YES in step S310), the processing proceeds to step S312. In a case where the user's eye is not in the proximity of the eyepiece portion 16 (NO in step S310), the processing proceeds to step S311.

In step S311, the system control unit 50 determines whether a predetermined time has elapsed after start of timer counting started when the message is displayed in step S309. In a case where the predetermined time has elapsed (YES in step S311), the processing proceeds to step S312. In a case where the predetermined time has not elapsed (NO in step S311), the processing proceeds to step S350. In step S350, like in step S304, the system control unit 50 determines whether the operation of switching the display setting has been performed. In a case where the switching operation has been performed (YES in step S350), the processing proceeds to step S353. In a case where the switching operation has not been performed (NO in step S350), the processing returns to step S310. In step S353, like in step S312 to be described below, the system control unit 50 changes the message into the non-display state. Then, the processing proceeds to step S317.

In step S312, the system control unit 50 changes the message displayed in step S309 into the non-display state. In a case where the determination result in step S310 indicates "YES", i.e., when the user's eye is in the proximity of the eyepiece portion 16 after the message is displayed, it is assumed that the user has viewed the EVF 29. In a case where the determination result in step S311 indicates "YES", i.e., in a case where the predetermined time has elapsed, it is assumed that the user can be sufficiently informed that the display destination is switched from the display unit 28 to the EVF 29. For the reasons described above, the displayed message is changed into the non-display state.

In step S313, the system control unit 50 switches the EVF 29 into the display state and switches the display unit 28 into the non-display state, and then turns off the eye proximity detection unit 57 (power saving state). Then, the processing proceeds to step S343. FIG. 4B illustrates a display example of the EVF 29 and the display unit 28 in this case when the user's eye is in the proximity of the eyepiece portion 16. FIG. 5C illustrates a case where the user's eye is not in the proximity of the eyepiece portion 16. These display examples illustrate the display state.

In step S314, the system control unit 50 determines whether Viewfinder Display Only is set as the display setting, with reference to the nonvolatile memory 56. In a case where Viewfinder Display Only is set as the display setting (YES in step S314), the processing proceeds to step S315. In a case where Viewfinder Display Only is not set as the display setting (NO in step S314), the processing proceeds to step S324.

In step S315, the system control unit 50 switches the EVF 29 into the display state and switches the display unit 28 into the non-display state. In this case, the EVF 29 and the display unit 28 perform display as illustrated in FIGS. 4B and 5C, regardless of whether the user's eye is in the proximity of the eyepiece portion 16.

In step S316, like in step S304, the system control unit 50 determines whether the operation of switching the display setting has been performed. In a case where the switching operation has been performed (YES in step S316), the processing proceeds to step S317. In a case where the switching operation has not been performed (NO in step S316), the processing proceeds to step S343.

In step S317, the system control unit 50 changes the display setting to Monitor Display Only and stores the changed display setting in the nonvolatile memory 56. Further, the system control unit 50 turns on the eye proximity detection unit 57 to start an eye proximity detection operation.

In step S318, like in step S302, the system control unit 50 determines whether the user's eye is in the proximity of the eyepiece portion 16. In a case where the user's eye is in the proximity of the eyepiece portion 16 (YES in step S318), the processing proceeds to step S319. In a case where the user's eye is not in the proximity of the eyepiece portion 16 (NO in step S318), the processing proceeds to step S323.

In step S319, the system control unit 50 displays a message indicating that the display destination is switched to the EVF 29. FIG. 4C illustrates a display example of the EVF 29 and the display unit 28 in this case. After the message is displayed, timer counting is started. In a case where the determination result in step S318 indicates "YES", it is highly likely that the user is not viewing the display unit 28, but is viewing the EVF 29. Accordingly, in response to the display setting switched from Viewfinder Display Only to Monitor Display Only by the display setting switching operation in step S316, the LV image that has been displayed on the EVF 29 suddenly disappears, and then nothing is displayed on the EVF 29. Although the user is the one who has switched the display setting by performing an operation, if the EVF 29 is suddenly switched to the non-display state, the user may be confused. Accordingly, it may be desirable to switch the EVF 29 to the non-display state after displaying a message, instead of suddenly switching the EVF 29 to the non-display state. With this configuration, the user can visually observe that the display destination is switched from the EVF 29 to the display unit 28, without changing the user's posture. in a case where the user does not wish to change the user's posture, the user can perform an additional switching operation to switch the display setting to another display setting.

In step S320, like in step S302, the system control unit 50 determines whether the user's eye is in the proximity of the eyepiece portion 16. In a case where the user's eye is in the proximity of the eyepiece portion 16 (YES in step S320), the processing proceeds to step S321. In a case where the user's eye is not in the proximity of the eyepiece portion 16 (NO in step S320), the processing proceeds to step S322.

In step S321, the system control unit 50 determines whether a predetermined time has elapsed after start of timer counting started when the message is displayed in step S319. In a case where the predetermined time has elapsed (YES in step S321), the processing proceeds to step S322. In a case where the predetermined time has not elapsed (NO in step S321), the processing proceeds to step S351. In step S351, like in step S304, the system control unit 50 determines whether the operation of switching the display setting has been performed. In a case where the switching operation has been performed (YES in step S351), the processing proceeds to step S354. In a case where the switching operation has not been performed (NO in step S351), the processing returns to step S320. In step S354, like in step S322 to be described below, the system control unit 50 changes the message into the non-display state. Then, the processing proceeds to step S327.

In step S322, the system control unit 50 changes the message displayed in step S319 into the non-display state. In a case where the determination result in step S320 indicates "NO", i.e., when the user's eye is not in the proximity of the eyepiece portion 16 after the message is displayed, it is assumed that the user's eye has moved away from the eyepiece portion 16 and the user is not viewing the EVF 29, but is viewing the display unit 28. In a case where the determination result in step S321 indicates "YES", i.e., when the predetermined time has elapsed, it is assumed that the user can be sufficiently informed that the display destination is switched. For the reasons described above, the displayed message is changed into the non-display state.

In step S323, the system control unit 50 switches the EVF 29 to the non-display state and switches the display unit 28 into the display state, and then turns off the eye proximity detection unit 57 (power saving state). Then, the processing proceeds to step S343. FIGS. 4D and 5D illustrate display examples of the EVF 29 and the display unit 28 in this case. These display examples illustrate the display state, regardless of whether the user's eye is in the proximity of the eyepiece portion 16.

In step S324, the system control unit 50 determines whether Monitor Display Only is set as the display setting with reference to the nonvolatile memory 56. In a case where it is determined that Monitor Display Only is set as the display setting (YES in step S324), the processing proceeds to step S325. In a case where it is determined that Monitor Display Only is not set as the display setting (NO in step S324), the processing proceeds to step S337.

In step S325, the system control unit 50 switches the EVF 29 to the non-display state and switches the display unit 28 to the display state. Then, the processing proceeds to step S326. In this case, the EVF 29 and the display unit 28 perform display as illustrated in FIGS. 4D and 5D, regardless of whether the user's eye is in the proximity of the eyepiece portion 16.

In step S326, like in step S304, the system control unit 50 determines whether the operation of switching the display setting has been performed. In a case where the switching operation has been performed (YES in step S326), the processing proceeds to step S327. In a case where the switching operation has not been performed (NO in step S326), the processing proceeds to step S343.

In step S327, the system control unit 50 changes the display setting to Viewfinder Priority Display and stores the changed display setting in the nonvolatile memory 56. The system control unit 50 also turns on the eye proximity detection unit 57 to start the eye proximity detection operation.

In step S328, the system control unit 50 determines whether the current operation mode corresponds to the image capturing mode. In a case where the current operation mode corresponds to the image capturing mode (YES in step S328), the processing proceeds to step S329. In a case where the current operation mode does not correspond to the image capturing mode (NO in step S328), the processing proceeds to step S343. As described above, in Viewfinder Priority Display set as the display setting, in a case where the image capturing mode is set and the user's eye is in the proximity of the eyepiece portion 16, the display destination of a LV image or the like is set to the EVF 29. In a case where the image capturing mode is set and the user's eye is not in the proximity of the eyepiece portion 16, nothing is displayed on the EVF 29 and the display unit 28. In this control operation, in a case where the user's eye is not in the proximity of the eyepiece portion 16, nothing is displayed on the display. Accordingly, the effect of power saving can be obtained. Meanwhile, in a mode other than the image capturing mode, the display destination of the image playback screen or the setting menu screen is switched based on whether the user's eye is in the proximity of the eyepiece portion 16. In other words, an operation similar to Automatic Switch is performed. Accordingly, in a case where the determination result in step S328 indicates "NO", the processing proceeds to a processing procedure that is performed in a case where Automatic Switch is set as the display setting in step S302 and subsequent steps.

In step S329, like in step S302, the system control unit 50 determines whether the user's eye is in the proximity of the eyepiece portion 16. In a case where the user's eye is in the proximity of the eyepiece portion 16 (YES in step S329), the processing proceeds to step S336 (YES in step S329). In a case where the user's eye is not in the proximity of the eyepiece portion 16 (NO in step S329), the processing proceeds to step S330.

In step S330, the system control unit 50 displays a message indicating that the display destination is switched to the display unit 28. FIG. 5E illustrates a display example of the EVF 29 and the display unit 28 in this case. After the message is displayed, timer counting is started. In a case where the determination result in step S329 indicates "NO", it is highly likely that the user is not viewing the EVF 29, but is viewing the display unit 28. Accordingly, in response to the display setting switched from Monitor Display Only to Viewfinder Priority Display by the display setting switching operation in step S326, the LV image that has been displayed on the display unit 28 suddenly disappears and the display is blacked out. Although the user is the one who has switched the display setting by performing an operation, if the display unit 28 is suddenly brought into the non-display state, the user may be confused. Accordingly, it may be desirable to switch the display unit 28 into the non-display state after displaying a message, instead of suddenly switching the display unit 28 into the non-display state. With this configuration, the user can visually observe that the display destination is switched from the display unit 28 to the EVF 29, without changing the user's posture. This enables the user's eye to be guided to the eyepiece portion 16 and the user to be guided to view the EVF 29, without confusion.

In step S331, like in step S302, the system control unit 50 determines whether the user's eye is in the proximity of the eyepiece portion 16. In a case where the user's eye is in the proximity of the eyepiece portion 16 (YES in step S331), the processing proceeds to step S335. In a case where the user's eye is not in the proximity of the eyepiece portion 16 (NO in step S331), the processing proceeds to step S332.

In step S332, the system control unit 50 determines whether a predetermined time has elapsed after start of timer counting started when the message is displayed in step S330. In a case where the predetermined time has elapsed (YES in step S332), the processing proceeds to step S333. In a case where the predetermined time has not elapsed (NO in step S332), the processing proceeds to step S352. In step S352, like in step S304, the system control unit 50 determines whether the operation of switching the display setting has been performed. In a case where the switching operation has been performed (YES in step S352), the processing proceeds to step S355. In a case where the switching operation has not been performed (NO in step S352), the processing returns to step S331. In step S355, like in step S333 to be described below, the system control unit 50 changes the message into the non-display state. Then, the processing returns to step S342.

In step S333, the system control unit 50 changes the message displayed in step S330 into the non-display state. In a case where the determination result in step S332 indicates "YES", i.e., in a case where the predetermined time has elapsed, it is assumed that the user can be sufficiently informed that the display destination is switched. For the reasons described above, the displayed message is changed into the non-display state.

In step S334, the system control unit 50 switches both the EVF 29 and the display unit 28 to the non-display state. Then, the processing proceeds to step S343. FIG. 5F illustrates a display example in this case.

In step S335, the system control unit 50 changes the message displayed in step S330 into the non-display state. In a case where the determination result in step S331 indicates "YES", i.e., in a case where the proximity detection of the user's eye is detected after display of the message, it is assumed that user's eye is in the proximity of the eyepiece portion 16 and the user is not viewing the display unit 28, but is viewing the EVF 29. For the reasons described above, the displayed message is changed into the non-display state.

In step S336, the system control unit 50 switches the EVF 29 into the display state and switches the display unit 28 into the non-display state. Then, the processing proceeds to step S343. FIG. 4E illustrates a display example in this case.

In step S337, the system control unit 50 determines whether the current operation mode corresponds to the image capturing mode. in a case where the current operation mode corresponds to the image capturing mode (YES in step S337), the processing proceeds to step S338. In a case where the current operation mode does not correspond to the image capturing mode (NO in step S337), the processing proceeds to step S343. In a case where the determination result in each of steps S301, S314, and S324 indicates "NO", it is assumed that Viewfinder Priority Display is set as the display setting.

In step S338, like in step S302, the system control unit 50 determines whether the user's eye is in the proximity of the eyepiece portion 16. In a case where the user's eye is in the proximity of the eyepiece portion 16 (YES in step S338), the processing proceeds to step S339. In a case where the user's eye is not in the proximity of the eyepiece portion 16 (NO in step S338), the processing proceeds to step S340.

In step S339, the system control unit 50 switches the EVF 29 into the display state and switches the display unit 28 into the non-display state. FIG. 4E illustrates a display example of the EVF 29 and the display unit 28 in this case.

In step S340, the system control unit 50 switches both the EVF 29 and the display unit 28 into the non-display state. FIG. 5F illustrates a display example of the EVF 29 and the display unit 28 in this case.

In step S341, like in step S304, the system control unit 50 determines whether the operation of switching the display setting has been performed. In a case where the switching operation has been performed (YES in step S341), the processing proceeds to step S342. In a case where the switching operation has not been performed (NO in step S341), the processing proceeds to step S343.

In step S342, the system control unit 50 changes the display setting to Automatic Switch and stores the changed display setting in the nonvolatile memory 56. Then, the processing returns to step S302.

Viewfinder Priority Display need not necessarily be included in the display settings. In other words, in a case where the determination result in step S324 indicates "NO", steps S337 to S342 may be skipped and the control processing may be returned to step S301 from step S324.

In step S343, the system control unit 50 determines whether an image capturing instruction is issued. In a case where the image capturing instruction is issued (YES in step S343), the processing proceeds to step S344. In a case where the image capturing instruction is not issued (NO in step S343), the processing proceeds to step S345. The image capturing instruction indicates that, for example, the second shutter switch 64 is turned on (i.e., the shutter button 61 is fully pressed), or a touch operation is performed on an image capturing button displayed on the display unit 28.

In step S344, the system control unit 50 performs a series of image capturing processing up to the processing in which captured images are recorded on the recording medium 200 as an image file. In a case where the image capturing instruction is issued in the image capturing standby state even during execution of the control processing in the flowchart illustrated in FIGS. 3A to 3C (i.e., a step other than step S343 is executed), image capturing processing is executed, and in a case where an operation is performed on the shutter button 61 in a state other than the image capturing standby state, the operation state is shifted to the image capturing standby state.

In step S345, the system control unit 50 determines whether the processing is completed. In a case where the processing is completed (YES in step S345), the flowchart of the control processing illustrated in FIGS. 3A to 3C is terminated. In a case where the processing is not completed (NO in step S345), the processing returns to step S301. The completion of the processing indicates, for example, when the operation mode is shifted from the image capturing mode to the playback mode (playback screen on which images are played back), when the operation mode is shifted from the playback mode to the image capturing mode, or when the power supply of the digital camera 100 is turned off.

In steps S310, S320, and S331, in a case where it is determined that the user's eye is in the proximity of the eyepiece portion 16, the message is changed into the non-display state even in a case where the predetermined time has not elapsed after display of the message. However, the control processing is not limited to the above-described processing. In other words, control processing may be performed such that the message is not changed into the non-display state as long as the predetermined time has not elapsed, which is a condition for changing the message into the non-display state from the display state, regardless of whether the user's eye is in the proximity of the eyepiece portion 16. With this control processing, the message is displayed for a predetermined period of time on the EVF 29 or the display unit 28 even in a case where the user's eye is erroneously in the proximity of or moved away from the eyepiece portion 16. Therefore, the display destination is switched after the lapse of the predetermined time. With this configuration, the user can reliably observe the display destination switch setting. Instead of changing the message into the non-display state based on the lapse of the predetermined time, the message may be changed into the non-display state based only on whether the user's eye is in the proximity of the eyepiece portion 16. Specifically, the processing may proceed to step S312 by skipping step S311, the processing may proceed to step S322 by skipping step S321, and the processing may proceed to step S333 by skipping step S332.

FIGS. 4A to 4E are diagrams each illustrating a display example of the EVF 29 and the display unit 28 when the user's eye is in the proximity of the eyepiece portion 16 in the present exemplary embodiment.

FIG. 4A illustrates a display example of the EVF 29 and the display unit 28 in a case where Automatic Switch is set as the display setting. A LV image 401 and a setting content 402 about image capturing as a display target are displayed on the EVF 29, and nothing is displayed on the display unit 28. In the setting content 402, the type of an AF operation is displayed as an icon, and "SERVO AF" is set in FIGS. 4A to 4E. In the control flowchart illustrated in FIGS. 3A to 3C, the display as illustrated in FIG. 4A is performed in step S303.

FIG. 4B illustrates a display example of the EVF 29 and the display unit 28 in a case where Viewfinder Display Only is set as the display setting. Since the user's eye is in the proximity of the eyepiece portion 16, even in a case where the display setting is switched from Automatic Switch to Viewfinder Display Only, there is no need to display a message indicating that the display destination is switched, as long as the user is continuously viewing the EVF 29. In this case, the display setting is switched to Viewfinder Display Only, and thus nothing is displayed on the display unit 28. In the control flowchart illustrated in FIGS. 3A to 3C, the display as illustrated in FIG. 4B is performed in step S313.

FIG. 4C illustrates a display example in a case where the display setting is changed from Viewfinder Display Only to Monitor Display Only and the predetermined time has not elapsed. In a case where the display destination switch button 82 is pressed in a state where the user's eye is in the proximity of the eyepiece portion 16, a message 403 illustrated in FIG. 4C is displayed. Since the user's eye is in the proximity of the eyepiece portion 16, it is obvious that the user is viewing the EVF 29. However, the display destination is switched to the display unit 28 by the display destination switching operation, and the display unit 28 is set as the display destination. Thus, nothing is displayed on the EVF 29. In a case where the EVF 29 is suddenly switched to the non-display state, the user may be confused. For this reason, for example, the message 403 is displayed. The display setting is switched from Viewfinder Display Only to Monitor Display Only in the display example illustrated in FIG. 4C. Accordingly, a message "display setting is switched to Monitor Display Only" is displayed as the message 403. In this operation, the LV image 401 and the setting content 402, which have been displayed on the EVF 29 before the display destination switching operation is performed are changed into the non-display state, and only the message 403 is displayed. This is because the user can clearly observe the message 403 as a message indicating that the display destination is switched. However, there is no need to change both the LV image 401 and the setting content 402 into the non-display state, as long as the message 403 can be easily observed. In other words, only the LV image 401 may be changed into the non-display state and the setting content 402 may be displayed. In this case, nothing is displayed on the display unit 28. In the control flowchart illustrated in FIGS. 3A to 3C, the display as illustrated in FIG. 4C is performed in step S319.

FIG. 4D illustrates a display example in a case where the predetermined time has elapsed after the message 403 is displayed on the EVF 29 as illustrated in FIG. 4C, or in a case where the user's eye has moved away from the eyepiece portion 16. The message 403 displayed on the EVF 29 illustrated in FIG. 4C is switched to the non-display state and the LV image 401 and the setting content 402 are displayed on the display unit 28. In the control flowchart illustrated in FIGS. 3A to 3C, the display as illustrated in FIG. 4D is performed in steps S323 and S325.

FIG. 4E illustrates a display example of the EVF 29 and the display unit 28 in a case where the display setting is switched from Monitor Display Only to Viewfinder Priority Display. In a case where the display destination switch button 82 is pressed in a state where the user's eye is in the proximity of the eyepiece portion 16, the LV image 401 and the setting content 402 are displayed on the EVF 29 and nothing is displayed on the display unit 28 as illustrated in FIG. 4E. In the control flowchart illustrated in FIGS. 3A to 3C, the display as illustrated in FIG. 4E is performed in steps S336 and S339.

FIGS. 5A to 5F are diagrams each illustrating a display example of the EVF 29 and the display unit 28 in a case where the user's eye is not in the proximity of the eyepiece portion 16 in the present exemplary embodiment. Since the user's eye is not in the proximity of the eyepiece portion 16, it is assumed that the user is viewing the display unit 28.

FIG. 5A illustrates a display example of the EVF 29 and the display unit 28 in a case where Automatic Switch is set as the display setting. Since the user's eye is not in the proximity of the eyepiece portion 16 in the display example illustrated in FIG. 5A, nothing is displayed on the EVF 29 and the LV image 401 and the setting content 402 are displayed on the display unit 28. In the control flowchart illustrated in FIGS. 3A to 3C, for example, the display as illustrated in FIG. 5A is performed in step S306.

FIG. 5B illustrates a display example in a case where the display setting is changed from Automatic Switch to Viewfinder Display Only and the predetermined time has not elapsed. In a case where the display destination switch button 82 is pressed in a state where the user's eye is not in the proximity of the eyepiece portion 16, nothing is displayed on the EVF 29 and a message 501 illustrated in FIG. 5B is displayed on the display unit 28. Since the user's eye is not in the proximity of the eyepiece portion 16, it is obvious that the user is viewing the display unit 28. However, since the display destination is to be switched to the EVF 29 by the display destination switching operation, nothing is to be displayed on the display unit 28. In a case where the display unit 28 is suddenly switched into the non-display state, the user who is viewing the display unit 28 may be confused. Accordingly, it may be desirable to display, for example, the message 501. Since the display setting is switched from Automatic Switch to Viewfinder Display Only in the display example illustrated in FIG. 5B, a message "display setting is switched to Viewfinder Display Only" is displayed as the message 501. In this operation, the LV image 401 and the setting content 402, which have been displayed on the display unit 28 before the display destination switching operation is performed, are changed into the non-display state, and only the message 501 is displayed. As described above in regard to the display of the message 403 illustrated in FIG. 4C, information other than the message 501 is changed into the non-display state, and therefore the user can clearly observe the message 501 indicating that the display destination is switched. In the control flowchart illustrated in FIGS. 3A to 3C, the display as illustrated in FIG. 5B is performed in step S309.

FIG. 5C illustrates a display example in a case where the predetermined time has elapsed after the message 501 is displayed on the display unit 28 as illustrated in FIG. 5B, or in a case where the user's eye is in the proximity of the eyepiece portion 16. The message 501 displayed on the display unit 28 in the display example illustrated in FIG. 5B is changed into the non-display state and the LV image 401 and the setting content 402 are displayed on the EVF 29. In the control flowchart illustrated in FIGS. 3A to 3C, the display as illustrated in FIG. 5C is performed in steps S313 and S315.

FIG. 5D illustrates a display example of the EVF 29 and the display unit 28 in a case where Monitor Display Only is set as the display setting. Since the user's eye is not in the proximity of the eyepiece portion 16, the message indicating that the display setting is switched is not displayed even in a case where the display setting is switched to Monitor Display Only. In this case, since the display setting is switched to Monitor Display Only, nothing is displayed on the EVF 29. In the control flowchart illustrated in FIGS. 3A to 3C, the display as illustrated in FIG. 5D is performed in steps S323 and S325.

FIG. 5E illustrates a display example in a case where the display setting is switched from Monitor Display Only to Viewfinder Priority Display and the predetermined time has not elapsed. In a case where the display destination switch button 82 is pressed in a state where the user's eye is not in the proximity of the eyepiece portion 16, nothing is displayed on the EVF 29 and a message 502 illustrated in FIG. 5E is displayed on the display unit 28. Since the user's eye is not in the proximity of the eyepiece portion 16, it is obvious that the user is viewing the display unit 28. However, in the image capturing standby state (image capturing mode), the display destination is to be switched to the EVF 29 by the display destination switching operation, or nothing is to be displayed on the EVF 29 and the display unit 28 as long as the user's eye is not in the proximity of the eyepiece portion 16. If the display unit 28 is suddenly changed into the non-display state, the user who is viewing the display unit 28 may be confused. Accordingly, it may be desirable to display, for example, the message 502. Since the display setting is switched from Monitor Display Only to Viewfinder Priority Display in the example illustrated in FIG. 5E, a message "display setting is switched to Viewfinder Priority Display" is displayed as the message 502. In this case, as described above with reference to FIG. 5B, the LV image 401 and the setting content 402, which have been displayed on the display unit 28 before the display destination switching operation is performed, are changed into the non-display state, and only the message 502 is displayed. In the control flowchart illustrated in FIGS. 3A to 3C, the display as illustrated in FIG. 5E is performed in step S330.

FIG. 5F illustrates a display example in a case where the predetermined time has elapsed after the message 502 illustrated in FIG. 5E is displayed on the display unit 28 and the user's eye is not in the proximity of the eyepiece portion 16. The message 502 displayed on the display unit 28 as illustrated in FIG. 5E is changed into the non-display state. Since the user's eye is not in the proximity of the eyepiece portion 16, the LV image 401 and the setting content 402 are not displayed on the EVF 29. In the control flowchart illustrated in FIGS. 3A to 3C, the display as illustrated in FIG. 5F is performed in steps S334 and S340.

Consider a case where the display setting is switched from Viewfinder Display Only to Monitor Display Only by the display setting switching operation by the user as illustrated in FIGS. 4B to 4D and FIGS. 5C and 5D. When the user's eye is in the proximity of the eyepiece portion 16 and the user is viewing the EVF 29 in the display examples illustrated in FIGS. 4B to 4D, the display destination is switched from the EVF 29 to the display unit 28 by the display setting switching operation. It is highly likely that the user who is viewing the EVF 29 may be confused if the LV image that has been displayed on the EVF 29 is suddenly changed into the non-display state. Accordingly, it may be desirable to display a message indicating that the display setting is switched to Monitor Display Only to inform the user that the display destination is to be switched from the EVF 29 to the display unit 28. With this configuration, the user can select whether to view the display unit 28 after the user moves the eye away from the eyepiece portion 16, or to further perform the switching operation for an additional switching operation to shift the setting to another setting to continuously view the LV image on the EVF 29 without changing the user's posture. Meanwhile, in a case where the user's eye is not in proximity of the eyepiece portion 16 and the user is viewing the display unit 28 in the display examples illustrated in FIGS. 5C and 5D, the LV image is displayed on the display unit 28 by the display setting switching operation. Accordingly, the user can visually observe the screen without changing the user's posture, and therefore displaying a message indicating that the display setting is switched is not necessary. Since a message is not to be displayed, the user can check various information, such as the LV image, and setting values on the display displayed in response to the switching operation with no time lag. Further, since information is displayed only on one of the EVF 29 and the display unit 28, the effect of power saving can be obtained in comparison with the case of displaying information on both the EVF 29 and the display unit 28.

Similarly, consider a case where the display setting is switched from Monitor Display Only to Viewfinder Priority Display by the switching operation by the user as illustrated in FIGS. 4D and 4E, and FIGS. 5D to 5F. In a case where the switching operation is performed in a state where the user's eye is in the proximity of the eyepiece portion 16 and the user is viewing the EVF 29 in the display examples illustrated in FIGS. 4D and 4E, the LV image is displayed on the EVF 29 viewed by the user, and therefore displaying a message is not necessary. Moreover, the user can check the LV image with no time lag without changing the user's posture in response to the switching operation. Since information is displayed only on one of the EVF 29 and the display unit 28, the effect of power saving can be obtained in comparison with the case of displaying information on both the EVF 29 and the display unit 28. Meanwhile, in a case where the user's eye is not in the proximity of the eyepiece portion 16 and the user is viewing the display unit 28 in the display examples illustrated in FIGS. 5D to 5F, the LV image that has been displayed on the display unit 28 is changed into the non-display state by the switching operation. Accordingly, it is highly likely that the user may be confused. In addition, in order to check the display destination, the user changes the user's posture, more specifically, changes the user's posture from viewing the display unit 28 to viewing the EVF 29 to check the display destination. Therefore, with the configuration in which the display destination is switched after a message (notification) indicating that the display setting is to be switched to Viewfinder Priority Display is displayed, the user can visually observe that the display setting is switched without changing the user's posture. This enables the user to select whether to view the EVF 29 with the user's eye in the proximity of the eyepiece portion 16, or to further perform the switching operation to continuously check the LV image on the display unit 28, without changing the user's posture.

By the above-described control processing, the user can visually observe switching of the display destination without changing the user's posture in response to the message which is displayed based on the user's line of sight and indicates that the display destination is changed, even when the display destination is switched by the display destination switching operation. Consequently, the user can switch the display setting to a desired display setting without changing the user's posture, and therefore a loss of image capturing opportunities can be reduced.

A screen transition in a case where the order of switching the display setting is changed from that in the exemplary embodiment described above and the display setting is switched from Monitor Display Only to Viewfinder Display Only will be described. In a case where the switching operation is performed in a state where the user's eye is in the proximity of the eyepiece portion 16 and the user is viewing the EVF 29, the display is shifted from the display state illustrated in FIG. 4D to the display state illustrated in FIG. 4B. It is assumed that the user is viewing the EVF 29, and displaying a message to inform the user that the display state is to be shifted is not necessary. In a case where the switching operation is performed in a state where the user's eye is not in the proximity of the eyepiece portion 16, or the user is viewing the display unit 28, the display is shifted from the display state illustrated in FIG. 5D to the display state illustrated in FIG. 5C via the display state illustrated in FIG. 5B. Since it is assumed that the user is viewing the display unit 28, if the display state is suddenly switched from the display state illustrated in FIG. 5D to the display state illustrated in FIG. 5C, it is highly likely that the user may be confused. Therefore, the message 501 illustrated in FIG. 5B is displayed to inform the user that the display destination is to be switched.

A screen transition in a case where the order of switching the display setting is changed from that described in the present exemplary embodiment described above and the display setting is switched from Viewfinder Priority Display to Monitor Display Only will be described. In a case where the user's eye is in the proximity of the eyepiece portion 16, the display state is shifted from the display state illustrated in FIG. 4E to the display state illustrated in FIG. 4D via the display state illustrated in FIG. 4C. In this case, it is assumed that the user is viewing the EVF 29. Accordingly, if the display is suddenly switched from the display state illustrated in FIG. 4E to the display state illustrated in FIG. 4D, it is highly likely that the user may be confused, like in the case where the display destination is switched from Viewfinder Display Only to Monitor Display Only. Therefore, the message 403 illustrated in FIG. 4C is displayed to inform the user that the display destination is to be switched. In this case, the message in the message 403 corresponds to the message 502 illustrated in FIG. 5E. In a case where the user's eye is not in the proximity of the eyepiece portion 16, the display state is shifted from the display state illustrated in FIG. 5F to the display state illustrated in FIG. 5D. In this case, it is assumed that the user is viewing the display unit 28, and therefore displaying a message to inform the user that the display state is to be shifted is not necessary.

The timing for changing the message into the display state or the non-display state by controlling the display based on whether the predetermined time has elapsed, or whether the user's eye is in the proximity of the eyepiece portion 16, has been described above with reference to FIGS. 4A to 4E and FIGS. 5A to 5F. The message is changed into the non-display state also in a case where the display destination switch button 82 or the playback button 79 is pressed. Specifically, even during the period in which the message is displayed on the EVF 29 as illustrated in FIG. 4C, in a case where the display destination switch button 82 is pressed by the user, the message is changed into the non-display state and the display destination is switched in response to the operation of pressing the display destination switch button 82. Similarly, in a case where the playback button 79 is pressed during the period in which the message is displayed, the message is changed into the non-display state from the image capturing standby state in which the message is displayed as illustrated in FIG. 4C, and the screen is shifted to the playback screen (playback mode). Even during the period in which the message is displayed, the message is changed into the non-display state in response to the operation of pressing a button and the display destination is switched, and therefore the user can visually observe switching of the display setting. In addition, the user can perform a subsequent operation without any loss of image capturing opportunities and without any time loss for checking playback images and setting menus. The message is not limited to the above-described message, but instead any message can be used as long as the user can be informed that the display setting is switched. The message is not limited to a message, but instead may be displayed as an icon.

The above-described various control operations that are performed by the system control unit 50 may be implemented by one piece of hardware, or the entire apparatus may be controlled by sharing the processing among a plurality of pieces of hardware (e.g., a plurality of processors or one or more circuits).

The exemplary embodiments described above illustrate an example where the present disclosure is applied to the digital camera 100. However, the present disclosure is not limited to this example. The present disclosure can be applied to any electronic apparatus that includes a plurality of display destinations and the eye proximity detection unit and has a function for switching the display destinations. Specifically, the present disclosure can be applied to a video camera, a mobile phone terminal equipped with a camera, and the like. When a video camera including a viewfinder internal display unit and a display unit outside viewfinder is used, the video camera can control whether to display a LV image or a playback image on both the viewfinder internal display unit and the display unit outside viewfinder, whether to display a LV image or a playback image on one of the viewfinder internal display unit and the display unit outside viewfinder, or whether to automatically switch the display destination.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014081, filed Jan. 30, 2020, which is hereby incorporated by reference herein in its entirety.

What is claimed is:

1. A display control apparatus comprising:
   a first display unit internal to a viewfinder;
   a second display unit external to the viewfinder, wherein the first display unit and the second display unit each are a display destination;
   an eye proximity detection unit configured to detect whether an eye is in proximity of the viewfinder as an eye proximity detection state; and
   at least one memory and at least one processor which function as:
   an operation unit configured to switch a display unit on which a display target is displayed, and
   a control unit,
   wherein the control unit is configured to control when a display setting is switched between a first setting for displaying the display target on the first display unit internal to the viewfinder and a second setting for displaying the display target on the second display unit external to the viewfinder by an operation on the operation unit,
   wherein, in a case where the obtained eye proximity detection state satisfies a first condition, the control unit performs control to display, on a pre-switching display unit, a notification indicating that the display unit displaying the display target is to be switched, wherein, in response to a second condition being satisfied, the control unit switches the display of the display target from the pre-switching display unit to a post-switching display unit, and wherein, in a case where the obtained eye proximity detection state does not satisfy the first condition, the control unit performs control to switch the display target to the post-switching display unit without displaying the notification on the pre-switching display unit.

2. The display control apparatus according to claim 1, wherein, when the display setting is switched from the first setting to the second setting by an operation on the operation unit, the control unit performs control to display the notification on the first display unit internal to the viewfinder in a case where the eye proximity detection unit has detected that the eye is in the proximity of the viewfinder, which is determined to be satisfying the first condition, and to switch the display target from the first display unit internal to the viewfinder to the second display unit external to the viewfinder in response to the second condition being satisfied, and wherein, in a case where the eye proximity detection unit has not detected that the eye is in the proximity of the viewfinder, the display destination is switched from the first display unit internal to the viewfinder to the second display unit external to the viewfinder without displaying the notification.

3. The display control apparatus according to claim 1, wherein, when the display setting is switched from the second setting to the first setting by an operation on the operation unit, the control unit performs control to display the notification on the second display unit external to the viewfinder in a case where the eye proximity detection unit has not detected that an eye is in the proximity of the viewfinder, which is determined to be satisfying the first condition, and to switch the display destination from the second display unit external to the viewfinder to the first display unit internal to the viewfinder in response to the second condition being satisfied, and performs control, in a case where the eye proximity detection unit has detected that the eye is in the proximity of the viewfinder, to switch the display destination from the second display unit external to the viewfinder to the first display unit internal to the viewfinder without displaying the notification.

4. The display control apparatus according to claim 1, wherein the first setting is a display setting for displaying the display target on the first display unit internal to the viewfinder, even in a case where the eye proximity detection unit has not detected that the eye is in the proximity of the viewfinder.

5. The display control apparatus according to claim 1, wherein the second setting is a display setting for displaying the display target on the second display unit external to the viewfinder, even in a case where the eye proximity detection unit has detected that the eye is in the proximity of the viewfinder.

6. The display control apparatus according to claim 1, wherein the second condition is that a predetermined time has elapsed after the notification is displayed.

7. The display control apparatus according to claim 1, wherein the second condition is that the eye proximity detection state obtained by the eye proximity detection unit has changed.

8. The display control apparatus according to claim 1, wherein the second condition is that an operation is performed on a second operation unit that is different from the operation unit for switching the display unit on which the display target is displayed.

9. The display control apparatus according to claim 1, wherein the control unit changes the notification into a non-display state in response to the second condition being satisfied.

10. The display control apparatus according to claim 1, wherein during a period in which the notification is displayed, the control unit changes the display target that has been displayed before the notification is displayed into a non-display state.

11. The display control apparatus according to claim 1, wherein the control unit sequentially shifts the display setting, in a predetermined order, to any one of a fourth setting, the first setting, the second setting, and a third setting every time an operation is performed on the operation unit, where the fourth setting is a setting for automatically switching the display destination based on whether the eye is in the proximity of the viewfinder.

12. The display control apparatus according to claim 1, wherein the display target for which the display destination is switched by a switching operation on the operation unit is at least one of the following: a live view image captured by an image capturing unit, a setting value for image capturing, a playback screen of an image recorded on a recording medium, or a setting menu screen.

13. The display control apparatus according to claim 1,
wherein the control unit turns off a power supply of the eye proximity detection unit in response to the display target being displayed on the first display unit internal to the viewfinder after the display setting is switched to the first setting by an operation on the operation unit, or in response to the display target being displayed on the second display unit external to the viewfinder after the display setting is switched to the second setting by an operation on the operation unit, and wherein the control unit turns on the power supply of the eye proximity detection unit in response to the display setting is switched to one of a third setting and a fourth setting by an operation on the operation unit.

14. The display control apparatus according to claim 1, wherein the control unit turns on a power supply of the eye proximity detection unit in response to the display setting being switched from the second setting to a third setting by an operation on the operation unit.

15. The display control apparatus according to claim 1, wherein the control unit changes the notification into a non-display state and switches the display destination in a case where an operation is performed on the operation unit in a state where the notification is displayed.

16. A method for a display control apparatus having a first display unit internal to a viewfinder, a second display unit external to the viewfinder, and an operation unit configured to switch a display unit on which a display target is displayed, wherein the first display unit and the second display unit each are a display destination, the method comprising:

detecting whether an eye is in proximity of the viewfinder as an eye proximity detection state;

performing control to control when a display setting is switched between a first setting for displaying the display target on the first display unit internal to the viewfinder and a second setting for displaying the display target on the second display unit external to the viewfinder by an operation on the operation unit;

performing control, in a case where the obtained eye proximity detection state satisfies a first condition, to display, on a pre-switching display unit, a notification indicating that the display unit displaying the display target is to be switched;

switching, in response to a second condition being satisfied, the display of the display target from the pre-switching display unit to a post-switching display unit; and performing control, in a case where the obtained eye proximity detection state does not satisfy the first condition, to switch the display target to the post-switching display unit without displaying the notification on the pre-switching display unit.

17. A non-transitory computer-readable storage medium storing a program to cause a computer to perform a method for a display control apparatus having a first display unit internal to a viewfinder, a second display unit external to the viewfinder, and an operation unit configured to switch a display unit on which a display target is displayed, wherein the first display unit and the second display unit each are a display destination, the method comprising:

detecting whether an eye is in proximity of the viewfinder as an eye proximity detection state;

performing control to control when a display setting is switched between a first setting for displaying the display target on the first display unit internal to the viewfinder and a second setting for displaying the display target on the second display unit external to the viewfinder by an operation on the operation unit;

performing control, in a case where the obtained eye proximity detection state satisfies a first condition, to display, on a pre-switching display unit, a notification indicating that the display unit displaying the display target is to be switched;

switching, in response to a second condition being satisfied, the display of the display target from the pre-switching display unit to a post-switching display unit; and performing control, in a case where the obtained eye proximity detection state does not satisfy the first condition, to switch the display target to the post-switching display unit without displaying the notification on the pre-switching display unit.

\* \* \* \* \*